United States Patent [19]

Matsuda et al.

[11] Patent Number: 5,269,596
[45] Date of Patent: Dec. 14, 1993

[54] TRACTION CONTROL THROUGH COLLECTIVE OR INDEPENDENT WHEEL BRAKING

[75] Inventors: Shohei Matsuda; Jiro Suzuki; Tsuyoshi Satoh; Kazutoshi Tashima; Toshio Yahagi, all of Wako, Japan

[73] Assignee: Honda Giken Kogyo Kabushiki Kaisha, Tokyo, Japan

[21] Appl. No.: 900,773

[22] Filed: Jun. 22, 1992

Related U.S. Application Data

[63] Continuation-in-part of Ser. No. 543,520, Jun. 26, 1990, abandoned.

[30] Foreign Application Priority Data

Jun. 28, 1989 [JP] Japan ................... 1-166414
Feb. 7, 1990 [JP] Japan ................... 2-27696

[51] Int. Cl.$^5$ .............................................. B60T 8/32
[52] U.S. Cl. ............................ 303/111; 303/110; 180/197
[58] Field of Search .............. 303/93, 95, 97, 99, 303/105, 107–111; 180/197

[56] References Cited

U.S. PATENT DOCUMENTS

| | | | |
|---|---|---|---|
| 3,893,535 | 7/1975 | Burckhardt et al. | 180/197 |
| 4,430,714 | 2/1984 | Matsuda et al. | 303/95 X |
| 4,432,430 | 2/1984 | Lind et al. | 180/197 |
| 4,778,223 | 10/1988 | Inoue | 303/93 X |
| 4,794,538 | 12/1988 | Cao et al. | 303/95 X |
| 4,836,618 | 6/1989 | Wakata et al. | 303/93 X |
| 4,848,851 | 7/1989 | Kuraoka et al. | 303/109 X |
| 4,862,368 | 8/1989 | Kost et al. | 303/109 X |
| 4,866,625 | 9/1989 | Kawamoto et al. | 303/107 X |
| 4,883,325 | 11/1989 | Shimanuki et al. | 303/103 X |
| 4,933,854 | 6/1990 | Miyake | 303/95 X |
| 4,946,015 | 8/1990 | Browalski et al. | 180/197 X |
| 4,979,784 | 12/1990 | Arikawa | 303/111 |
| 4,981,190 | 1/1991 | Nakayama et al. | 303/110 X |
| 4,984,165 | 1/1991 | Müller et al. | 180/197 X |
| 5,015,041 | 5/1991 | Kuwana et al. | 303/97 X |

FOREIGN PATENT DOCUMENTS 0166178 1/1986 European Pat. Off. .
0265969 5/1988 European Pat. Off. .
2509242 1/1983 France .

*Primary Examiner*—Douglas C. Butler
*Assistant Examiner*—Josie A. Ballato
*Attorney, Agent, or Firm*—Armstrong, Westerman, Hattori, McLeland & Naughton

[57] ABSTRACT

A traction control method for a vehicle according to the present invention for generating braking forces in the brake devices for driving wheels when excessive slipping has occurred in the drive wheels involves an independent control mode for independently controlling respective braking forces of the plurality of drive-wheel brake devices and a collective control mode for collectively controlling the braking forces. These two control modes are interchangeable with each other. This enables traction control which can insure both reliable driving force and high stability.

11 Claims, 4 Drawing Sheets

TRACTION CONTROL THROUGH COLLECTIVE OR INDEPENDENT WHEEL BRAKING

This application is a continuation-in-part of application Ser. No. 07/543,520 filed Jun. 26, 1990, now abandoned.

BACKGROUND OF THE INVENTION

1. FIELD OF THE INVENTION

The field of the present invention is traction control methods for vehicles, specifically directed to producing a braking force in drive-wheel brake devices when an excessively slipping tendency has occurred in a drive wheel during operation.

2. DESCRIPTION OF THE PRIOR ART

Such traction control methods have been already known, for example, from U.S. Pat. No. 3,893,535.

The prior art methods disclosed therein include two types: one is to independently control the hydraulic braking pressures for left and right drive-wheel brake devices, and the other is to collectively control the hydraulic braking pressure for the left and right drive-wheel brake devices, both types of methods being effected when an excessive slipping tendency has occurred in a drive wheel in driving operation.

When excessive slipping occurs in the drive wheels of a vehicle travelling on a sloping road or on a road surface with the drive wheels in contact with the road surface at portions with different friction coefficients, the hydraulic braking pressure for the drive-wheel brake devices should be independently controlled in order to rapidly recover the driving force. In contrast, when excessive slipping occurs in the drive wheels in the course of the travelling of the vehicle at a relatively high speed, the hydraulic braking pressure for the drive-wheel brake devices should be collectively controlled so as to maintain the stability of the vehicle. However, if the hydraulic braking pressure is controlled in a fixed control mode as in the prior art, no satisfactory result can be achieved with respect to either the driving force or the stability.

SUMMARY OF THE INVENTION

The present invention has been accomplished with the above circumstances in view, and it is an object of the present invention to provide a traction control method for a vehicle, wherein the changeover in control modes for the drive-wheel brake devices is effected depending on whether the driving force should be considered more or the vehicle stability should be considered more to thereby improve the driving force and the stability while maintaining the harmony therebetween.

To achieve the above object, according to the present invention, an independent control mode for independently controlling the braking forces of a plurality of drive-wheel brake devices and a collective control mode for collectively controlling the braking forces of the drive-wheel brake devices are changeable from one to the other.

This enables traction control which can insure both reliable driving force and high stability.

In the independent control mode, interference may occur between the drive wheels which are under the traction control and an engine mounted on the vehicle. If, target value of the drive-wheel velocities is previously set at a given levels in the independent control mode and the collective control mode, a restraining force may act on the engine from the drive wheel side so as to reduce the number of revolutions of engine output. For example, if the traction control in the independent control mode is effected as the excessive slipping tendency shown in either the left and right drive wheels has been increased, the difference between the actual number of revolutions of the engine and the ideal number of revolutions of the engine output which may be evaluated from approximately ½ of the sum of velocities of the left and right drive wheels increases. This results in an increased restraining force being applied to the engine side from the drive wheel side. This may lead to a reduction in the number of revolutions of engine output more than necessary, and/or to control hunting.

To eliminate this possibility, the target values of the drive-wheel velocities in the independent control mode may be set larger than those provided in the collective control mode.

In doing so, it is possible to suppress application of a restraining force to the engine side from the drive wheel side during the traction control operation in the independent control mode, thereby avoiding any excessive reduction in the number of revolutions of the engine output and any reduction in operation control.

The above and other objects, features and advantages of the invention will become apparent from a reading of the following description of the preferred embodiment, taken in conjunction with the accompanying drawings.

BRIEF DESCRIPTION OF THE DRAWINGS

The drawings illustrate one embodiment of the present invention, wherein.

DESCRIPTION OF THE PREFERRED EMBODIMENT

Figure 1:
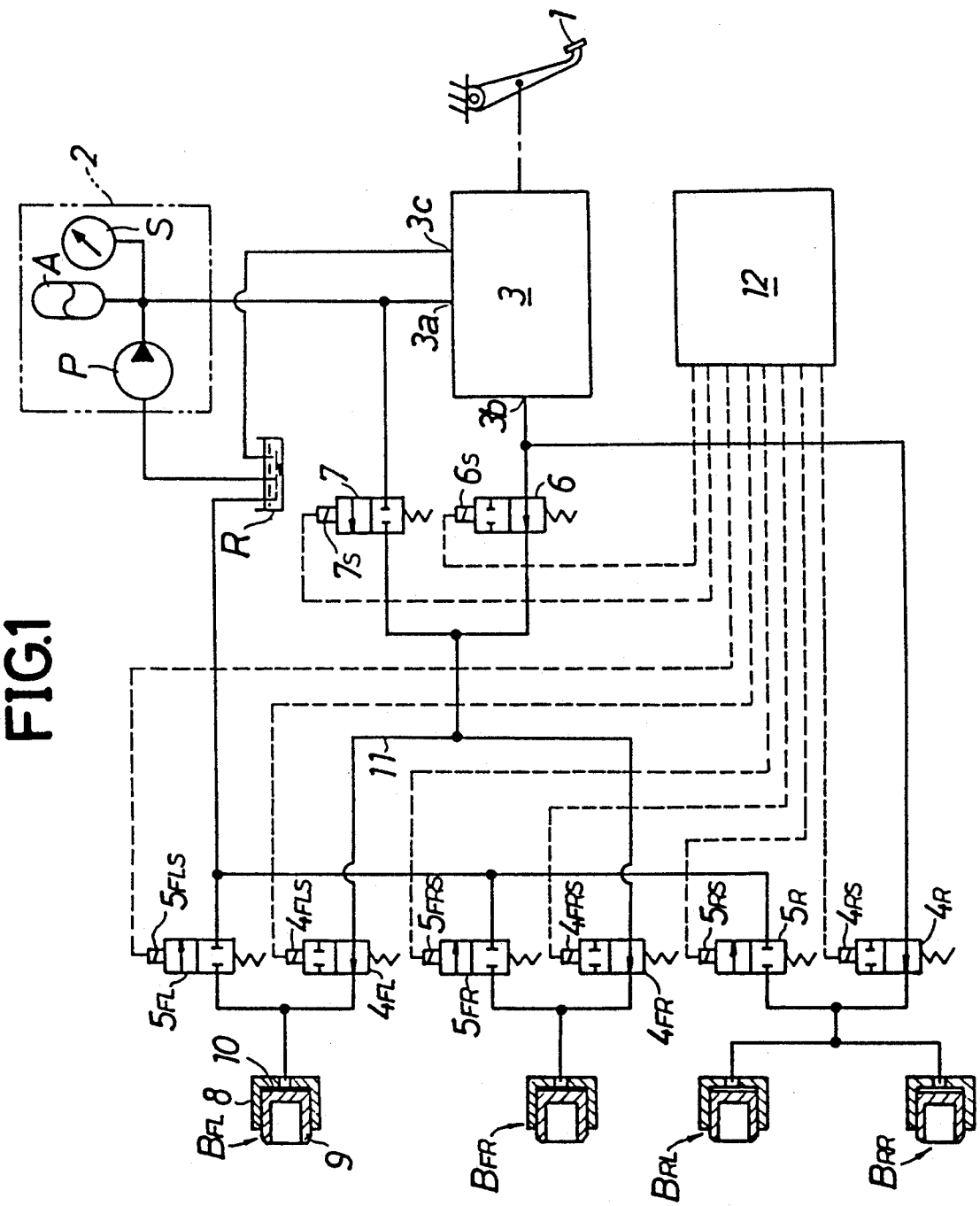
FIG. 1 is a hydraulic circuit diagram schematically illustrating a hydraulic braking pressure system.

The present invention will now be described by way of one embodiment which is applied to a front engine and a front drive vehicle. Referring first to FIG. 1, left and right drive-wheel brake devices $B_{FL}$ and $B_{FR}$ are mounted on the left and right front wheels of the vehicle, respectively, serving as drive or traction wheels and to left and right driven-wheel brake devices $B_{RL}$ and $B_{RR}$ are mounted on the left and right rear wheels, respectively, serving as driven or follower wheels. A hydraulic braking pressure producing means 3 is connected to a brake pedal 1 for outputting the hydraulic pressure from a hydraulic pressure supply source 2 in a controlled manner in accordance with the degree the brake pedal 1 is depressed, so that during normal braking, the output hydraulic pressure from the hydraulic braking pressure producing means 3 is provided to each of the wheel brake devices $B_{FL}$, $B_{FR}$, $B_{RL}$ and $B_{RR}$. The hydraulic braking pressure for the brake devices $B_{FL}$, $B_{FR}$, $B_{RL}$ and $B_{RR}$ can be maintained or reduced to effect an antilock control by means of flow-in solenoid valves $4_{FL}$ and $4_{FR}$ and flow-out solenoid valves $5_{FL}$ and $5_{FR}$ mounted individually in correspondence to the drive-wheel brake devices $B_{FL}$ and $B_{FR}$ as well as flow-in and flow-out solenoid valves $4_R$ and $5_R$ mounted commonly for the driven-wheel brake devices $B_{RL}$ and $B_{RR}$ In addition, the hydraulic braking pressure can be controlled to effect a traction control by means of normally-opened and normally-closed type traction-control solenoid valves 6 and 7 as well as the flow-in solenoid valves $4_{FL}$, $4_{FR}$ and flow-out solenoid valves $5_{FL}$, $5_{FR}$.

The hydraulic pressure supply source 2 comprises a hydraulic pump P for pumping a working fluid from a reservoir R, an accumulator A connected to the hydraulic pump P, and a pressure switch S for controlling the operation of the hydraulic pump P.

The hydraulic braking pressure producing means 3 includes an input port $3a$ leading to the hydraulic pressure supply source 2, an output port $3b$, and a release port $3c$ leading to the reservoir R and is designed to produce a hydraulic pressure in accordance with the amount that brake pedal 1 is depressed from the output port $3b$ while changing over the communication between the output port $3b$ and the input port $3a$ and the communication between the output port $3b$ and the release port $3c$ in response to the depression of the brake pedal 1.

Each of the brake devices $B_{FL}$, $B_{FR}$, $B_{RL}$ and $B_{RR}$ comprises a cylinder body 8 and a braking piston 9 slidably received in the cylinder body 8, so that a braking force is exhibited by the movement of the braking piston 9 in accordance with the hydraulic pressure applied to a braking hydraulic pressure chamber 10 defined between the cylinder body 8 and the braking piston 9.

The flow-in solenoid valves $4_{FL}$ and $4_{FR}$, are arranged in parallel to the flow-out solenoid valves $5_{FL}$ and $5_{FR}$, respectively, and connected to the respective hydraulic braking pressure chambers 10 in the drive-wheel brake devices $B_{FL}$ and $B_{FR}$. The flow-in solenoid valve $4_R$ and the flow-out solenoid valve $5_R$ are arranged in parallel and connected to the hydraulic braking pressure chambers 10 in the driven-wheel brake devices $B_{RL}$ and $B_{RR}$. The flow-in solenoid valves $4_{FL}$, $4_{FR}$ and $4_R$ are solenoid valves which are adapted to be closed during excitation of solenoids $4_{FLS}$, $4_{FRS}$ and $4_{RS}$, and the flow-out solenoid valves $5_{FL}$, $5_{FR}$ and $5_R$ are solenoid valves which are adapted to be opened during excitation of solenoids $5_{FLS}$, $5_{FRS}$ and $5_{RS}$. Moreover, the flow-in solenoid valves $4_{FL}$ and $4_{FR}$ are interposed between the hydraulic braking pressure chambers 10 in the drive-wheel brake devices $B_{FL}$ and $B_{FR}$ and an oil passage 11, while the flow-out solenoid valves $5_{FL}$ and $5_{FR}$ are interposed between the hydraulic braking pressure chambers 10 in the drive-wheel brake devices $B_{FL}$ and $B_{FR}$ and the reservoir R. The flow-in solenoid valve $4_R$ is interposed between the hydraulic braking pressure chambers 10 in the driven-wheel brake devices $B_{RL}$ and $B_{RR}$ and the output port $3b$ in the hydraulic braking pressure producing means 3, while the flow-out solenoid valve $5_R$ is interposed between the hydraulic braking pressure chambers 10 in the driven-wheel brake devices $B_{RL}$ and $B_{RR}$ and the reservoir R.

The normally-opened type traction control solenoid valve 6 is interposed between the oil passage 11 and the output port $3b$ in the hydraulic braking pressure producing means 3, while the normally-closed type traction control solenoid valve 7 is interposed between the oil passage 11 and the hydraulic pressure supply source 2.

The excitation and deexcitation of the respective solenoids $4_{FLS}$, $4_{FRS}$, $4_{RS}$, $5_{FLS}$, $5_{FRS}$, $5_{RS}$, $6_S$ and $7_S$ in the solenoid valves $4_{FL}$, $4_{FR}$, $4_R$, $5_{FL}$, $5_{FR}$, $5_R$, 6 and 7 are controlled by a control means 12, and in a normal condition, the solenoids $4_{FLS}$, $4_{FRS}$, $4_{RS}$, $5_{FLS}$, $5_{FRS}$, $5_{RS}$, $6_S$ and $7_S$ are in their deexcited states. In an anti-lock brake control during braking, any of the flow-in solenoid valves $4_{FL}$, $4_{FR}$ and $4_R$ associated with a wheel which is about to become locked is closed, whereby increasing of the braking force can be suppressed to avoid the wheels locking. When the wheel is still likely to be locked, a corresponding one of the flow-out solenoid valves $5_{FL}$, $5_{FR}$ and $5_R$ are opened to reduce the braking force, whereby the locking tendency of the wheel is eliminated.

When the drive wheels are about to dip excessively, the hydraulic pressure from the hydraulic pressure supply source 2 is applied to the oil passage 11 by excitation of the solenoids $6_S$ and $7_S$ of the normally-opened and normally-closed type traction-control solenoid valves 6 and 7. To increase the braking force, the hydraulic pressure in the oil passage 11, with the solenoids $4_{FLS}$, $4_{FRS}$, $5_{FLS}$ and $5_{FRS}$ remaining deexcited, is applied to the hydraulic braking pressure chambers 10 in the drive-wheel brake devices $B_{FL}$ and $B_{FR}$. To maintain the braking force, the solenoids $4_{FLS}$ and $4_{FRS}$ are excited with the solenoids $5_{FLS}$ and $5_{FRS}$ remaining deexcited, thereby maintaining the hydraulic braking pressure in the hydraulic braking pressure chambers 10 at a current level. Further, to reduce the braking force, the solenoids $4_{FLS}$, $4_{FRS}$, $5_{FLS}$ and $5_{FRS}$ are excited to release the hydraulic pressure in the hydraulic braking pressure chambers 10. In conducting such a traction control, the operation of control means 12 may be changed-over between an independent control mode and a collective control mode. The construction of essential portions of the control means 12 therefor will be described below.

Figure 2:
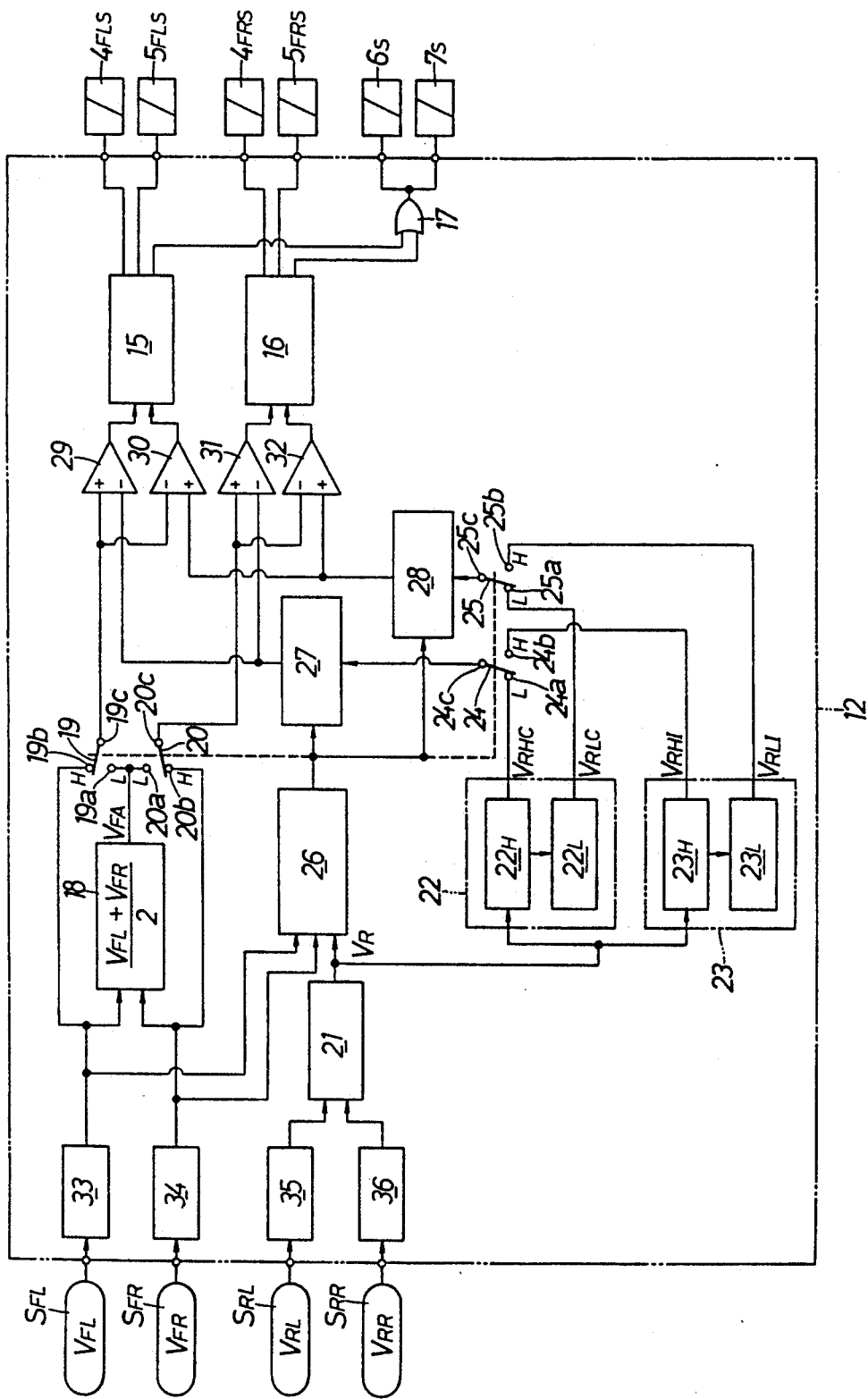
FIG. 2 is a block diagram illustrating a construction of essential portions of a control means.

Referring to FIG. 2, the control means 12 comprises a left drive-wheel solenoid control circuit 15 connected to the solenoids $4_{FLS}$ and $5_{FLS}$ of the flow-in and flow-out solenoid valves $4_{FL}$ and $5_{FL}$ associated with the left drive-wheel brake device $B_{FL}$, a right drive-wheel solenoid control circuit 16 connected to the solenoids $4_{FRS}$ and $5_{FRS}$ of the flow-in and flow-out solenoid valves $4_{FR}$ and $5_{FR}$ associated with the right drive-wheel brake device $B_{FR}$, an OR circuit 17 having input terminals to which the solenoid control circuits 15 and 16 are connected in parallel and an output terminal connected to the solenoids $6_S$ and $7_S$ of the normally-opened and normally-closed type solenoid valves 6 and 7, an averaging circuit 18 for averaging left and right drive-wheel velocities $V_{FL}$ and $V_{FR}$, a first change-over switch 19 for alternatively outputting an averaged drive-wheel velocity $V_{FA}$ averaged in the averaging circuit 18 or the left drive-wheel velocity $V_{FL}$ in accordance with the control mode, and a second change-over switch 20 for alternatively outputting the averaged drive-wheel velocity $V_{FA}$ or the right drive-wheel velocity $V_{FR}$ in accordance with the control mode. The control means 12 further includes a high select circuit 21 for selecting a higher one of left and right driven-wheel velocities $V_{RL}$ and $V_{RR}$ and outputting the selected one as a vehicle velocity $V_R$, a collectively-controlling target-velocity determining circuit 22 for determining a drive-wheel target-velocity for the collective control mode on the basis of the vehicle velocity $V_R$ provided in the high select circuit 21, an independently-controlling target-velocity determining circuit 23 for determining a drive-wheel target-velocity for the independent control mode on the basis of the vehicle velocity $V_R$, third and fourth change-over switches 24 and 25 for alternatively picking up and outputting one of the target velocities determined in the target-velocity determining circuits 22 and 23, a control mode judging circuit 26 for judging which of the independent control mode and the collective control mode is to be selected, progressively increasing or decreasing circuits 27 and 28 for progressively increasing or decreasing the target velocities outputted from the third and fourth change-over switches 24 and 25 of the time of change-over between the independent control mode and the collective control mode, comparator circuits 29 and 30 for comparing the drive-wheel velocity outputted from the first change-over switch 19 with the target velocities from the progressively increasing or decreasing circuits 27 and 28 to deliver the result of such comparison into the left drive-wheel solenoid control circuit 15, and comparator circuits 31 and 32 for comparing the drive-wheel velocity outputted from the second change-over switch 20 with the target velocities from the progressively increasing or decreasing circuits 27 and 28 to deliver the result of such comparison into the right drive-wheel solenoid control circuit 16.

Drive-wheel velocity detecting sensors $S_{FL}$ and $S_{FR}$ are mounted on the left and right front wheels as drive or traction wheels, so that the drive-wheel velocities $V_{FL}$ and $V_{FR}$ are inputted to filters 33 and 34 in the control means 12, respectively. Driven-wheel velocity detecting sensors $S_{RL}$ and $S_{RR}$ are also mounted on the left and right rear wheels as driven or follower wheels, so that the driven-wheel velocities $V_{RL}$ and $V_{RR}$ are inputted to filters 35 and 36 in the control means 12, respectively.

The filters 33 and 34 are connected to the averaging circuit 18 where an averaging calculation of the drive-wheel velocities $V_{FL}$ and $V_{FR}$ after noises are removed therefrom in the filters 33 and 34 (i.e., a calculation according to an expression $V_{FA}=(V_{FL}+V_{FR})/2$ is effected). As a result of this calculation, the averaged drive-wheel velocity $V_{FA}$ is outputted from the averaging circuit 18.

The first change-over switch 19 is adapted to change over the state of the connection of a separate contact 19a connected to the averaging circuit 18 and a separate contact 19b connected to the filter 33 with respect to a common contact 19c in accordance with the output from the control mode judging circuit 26, such that if the output from the control mode judging circuit 26 is at a low level, the separate contact 19a and the common contact 19c are interconnected, and if the output from the control mode judging circuit 26 goes into a high level, the separate contact 19b and the common contact 19c are interconnected. The second change-over switch 20 is adapted to change over the state of connections of a separate contact 20a connected to the averaging circuit 18 and a separate contact 20b connected to the filter 34 with respect to a common contact 20c in accordance with the output from the control mode judging circuit 26, such that if the output from the control mode judging circuit 26 is at a low level, the separate contact 20a and the common contact 20c are interconnected, and if the output from the control mode judging circuit 26 goes into a high level, the separate contact 20b and the common contact 20c are interconnected.

The driven-wheel velocities $V_{RL}$ and $V_{RR}$ are, after noise is removed therefrom in the filters 35 and 36, inputted into the high select circuit 21. The high select circuit 21 is adapted to select the higher one of the driven-wheel velocities $V_{RL}$ and $V_{RR}$ to deliver it.

The collectively controlling target-velocity determining circuit 22 is adapted to determine the target velocity for the drive wheels when the collective control mode has been selected, on the basis of the vehicle velocity $V_R$ inputted thereinto from the high select circuit 21. The target-velocity determining circuit 22 comprises a higher target-velocity calculating circuit $22_H$ for calculating a higher target velocity $V_{RHC}$ on the basis of the vehicle velocity $V_R$, and a lower target-velocity calculating circuit $22_L$ for calculating a lower target velocity $V_{RLC}$ on the basis of the higher target velocity $V_{RHC}$.

In the higher target-velocity calculating circuit $22_H$, the higher target velocity $V_{RHC}$ (km/hr) is calculated, for example, according to the following expression (1):

$$V_{RHC}=(17/16)\times V_R+10.5 \qquad (1)$$

In the lower target-velocity calculating circuit $22_L$, the lower target velocity $V_{RLC}$ (km/hr) is calculated, for example, according to the following expression (2):

$$V_{RLC}=V_{RHC}-3 \qquad (2)$$

The independently-controlling target-velocity determining circuit 23 determines the target velocity for the drive wheels when the independent control mode has been selected, on the basis of the velocity $V_R$ inputted thereinto from the high select circuit 21. This target-velocity determining circuit 23 comprises a higher target-velocity calculating circuit $23_H$ for calculating a higher target velocity $V_{RHI}$ on the basis of the vehicle velocity $V_R$, and a lower target-velocity calculating circuit $23_L$ for calculating a lower target velocity $V_{RLI}$ on the basis of the higher target velocity $V_{RHI}$.

In the higher target-velocity calculating circuit $23_H$, the higher target velocity $V_{RHI}$ (km/hr) is calculated, for example, according to the following expression (3):

$$V_{RHI}=(17/16)\times V_R+15.5 \qquad (3)$$

In the lower target-velocity calculating circuit $23_L$, the lower target velocity $V_{RLI}$ (km/hr) is calculated, for example, according to the following expression (4):

$$V_{RLI}=V_{RHI}-4 \qquad (4)$$

Figure 3:
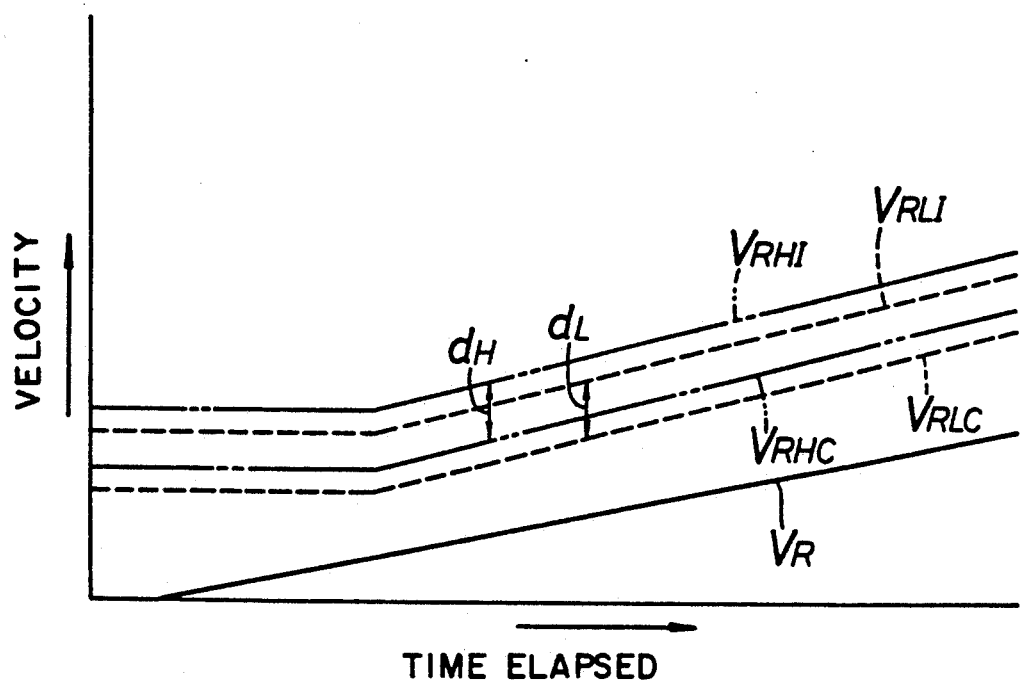
FIG. 3 is a graph illustrating target values in a collective control mode and in an independent control mode, respectively.

The target velocities determined in the collectively controlling target-velocity determining circuit 22 and independently-controlling target-velocity determining circuit 23 are graphically illustrated in FIG. 3. More specifically, the higher target velocity $V_{RHI}$ for use in the independent control mode is set higher by $d_H$ than the higher target velocity $V_{RHC}$ for use in the collective control mode, while the lower target velocity $V_{RLI}$ for use in the independent control mode is set higher by $d_L$ than the lower target velocity $V_{RLC}$ for use in the collective control mode. According to the above-described expressions (1) to (4), the $d_H$ is 5 km/hr, and the $d_L$ is 4 km/hr.

The third change-over switch 24 is adapted to change over, in accordance with the output from the control mode judging circuit 26, the state of the connection of a separate contact 24a connected to the higher target-velocity calculating circuit $22_H$ of the collectively-controlling target velocity determining circuit 22 and a separate contact 24b connected to the higher target-velocity calculating circuit $23_H$ of the independently-controlling target-velocity determining circuit 23 with a common contact 24c connected to the progressively increasing or decreasing circuit 27. If the output from the control mode judging circuit 26 is at a low level, then the separate contact 24a and the common contact 24c are interconnected, and if the output from the control mode judging circuit 26 goes into a high level, then the separate contact 24b and the common contact 24c are interconnected. The fourth change-over switch 25 is adapted to change over, in accordance with the output from the control mode judging circuit 26, the date of the connection of a separate contact 25a connected to the lower target-velocity calculating circuit $22_L$ of the collectively-controlling target-velocity determining circuit 22 and a separate contact 25b connected to the lower target-velocity calculating circuit 23 $_L$ of the independently-controlling target-velocity determining circuit 23 with respect to a common contact 25c connected to the progressively increasing or decreasing circuit 28. If the output from the control mode judging circuit 26 is at a low level, then the separate contact 25a and the common contact 25c are inter-connected, and if the output from the control mode judging circuit 26 goes into a high level, then the separate contact 25b and the common contact 25c are interconnected.

The drive wheel velocities $V_{FL}$ and $V_{FR}$ after noise has been removed therefrom and the vehicle velocity $V_R$ from the high select circuit 21 are inputted into the control mode judging circuit 26. Then, the control mode judging circuit 26, for example, on the basis of a deviation between the drive-wheel velocities $V_{FL}$ and $V_{FR}$ and of the vehicle velocity $V_R$, judges whether driving force should be made more account of, or vehicle stability should be made more account of, and if it is decided that the independent control mode should be selected, then the circuit 26 generates a high level signal. If it is decided that the collective control mode should be selected, then the circuit 26 generates a low level signal.

Therefore, when the collective control mode is selected, the averaged drive-wheel velocity $V_{FA}$ is outputted from the common contact 19c of the first change-over switch 19; the averaged drive-wheel velocity $V_{FA}$ is outputted from the common contact 20c of the second change-over switch 20; the higher target velocity $V_{RHC}$ for the collective control mode is outputted from the common contact 24c of the third change-over switch 24; and the lower target velocity $V_{RLC}$ for the collective control mode is outputted from the common contact 25c of the fourth change-over switch 25. Meanwhile, when the independent control mode is selected, the left drive-wheel velocity $V_{FL}$ is outputted from the common contact 19c of the first change-over switch 19; the right drive-wheel velocity $V_{FR}$ is outputted from the common contact 20c of the second change-over switch 20; the higher target velocity $V_{RHI}$ for the independent control mode is outputted from the common contact 24c of the third change-over switch 24; and the lower target velocity $V_{RLI}$ for the independent control mode is outputted from the common contact 25c of the fourth change-over switch 25.

Figure 4:
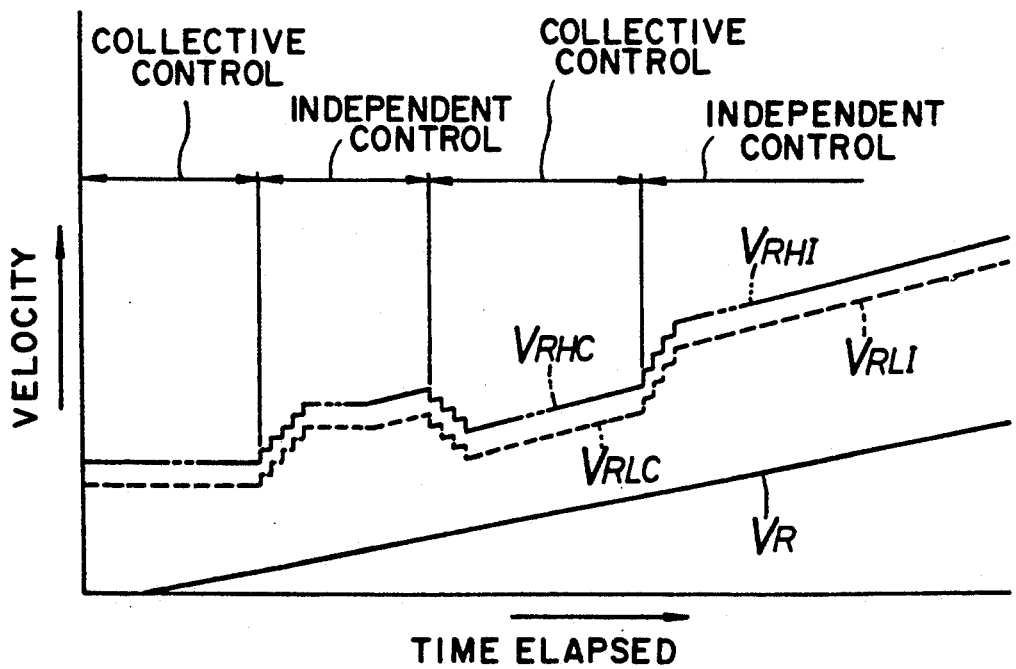
FIG. 4 is a graph illustrating variations in target values of drive-wheel velocities for change-over between the collective control mode and the independent control mode.

The progressively increasing or decreasing circuits 27 and 28 are adapted to progressively increase or decrease the target velocity received from the third and fourth change-over switches 24 and 25 at the time of change-over between the collective and independent control modes. Specifically, when the collective control mode is changed over to the independent control mode, as shown in FIG. 4 (i.e., when the signal received into the progressively increasing or decreasing circuits 27 and 28 from the control mode judging circuit 26 has been brought from the lower level into the higher level) the progressively increasing or decreasing circuit 27 stepwise increases the higher target velocity from the value $V_{RHC}$ to the value $V_{RHI}$, and the progressively increasing or decreasing circuit 28 stepwise increases the lower target velocity from the value $V_{RLC}$ to the value $V_{RLI}$. When the independent control mode is changed over to the collective control mode (i.e., when the output signal from the control mode judging circuit 26 has been brought from the higher level to the lower level) the progressively increasing or decreasing circuit 27 stepwise decreases the higher target velocity from the $V_{RHI}$ to the $V_{RHC}$, and the progressively increasing or decreasing circuit 28 stepwise decreases the lower target velocity from the $V_{RLI}$ to the $V_{RLC}$.

The common contact 19c of the first change-over switch 19 is connected to a non-inverted input terminal of the comparator circuit 29, and the progressively increasing or decreasing circuit 27 is connected to an inverted input terminal of the comparator circuit 29 whose output terminal is connected to the left drive-wheel solenoid control circuit 15. Thus, the comparator circuit 29 supplies a high level signal to the left drive-wheel solenoid control circuit 15 when the drive-wheel velocity received from the common contact 19c has exceeded the higher target velocity received from the progressively increasing or decreasing circuit 27.

The common contact 19c is connected to an inverted input terminal of the comparator circuit 30, and the progressively increasing or decreasing circuit 28 is connected to a non-inverted input terminal of the comparator circuit 30 whose output terminal is connected to the left drive-wheel solenoid control circuit 15. Thus, the comparator circuit 30 supplies a high level signal to the left drive-wheel solenoid control circuit 15 when the drive-wheel velocity received from the common contact 19c is equal to or less than the lower target velocity received from the progressively increasing or decreasing circuit 28.

The comparator circuits 31 and 32 correspond to the comparator circuits 29 and 30, respectively. The comparator circuit 31 delivers a high level signal to the right drive-wheel solenoid control circuit 16 when the drive-wheel velocity received from the common contact 20c has exceeded the higher target velocity received from the progressively increasing or decreasing circuit 27, and the comparator circuit 32 delivers a high level signal to the right drive-wheel solenoid control circuit 16 when the drive-wheel velocity received from the common contact 20c is equal to or less than the lower target velocity received from the progressively increasing or decreasing circuit 28.

Each of the left and right drive-wheel solenoid control circuits 15 and 16 is adapted to deliver a signal indicative of a command to control the excitation and deexcitation of the individual solenoids $4_{FLS}$, $4_{FRS}$, $5_{FLS}$, $5_{FRS}$, $6_S$, $7_S$ on the basis of input signals from the corresponding comparator circuits 29, 30, 31, 32, respectively, so that the left and right drive-wheel velocities are controlled to fall in a range between the higher target velocities $V_{RHC}$ and $V_{RHI}$ and the lower target velocities $V_{RLC}$ and $V_{RLI}$.

With the control means 12 thus constructed, the control of the excitation and deexcitation of the individual solenoids $4_{FLS}$, $4_{FRS}$, $5_{FLS}$, $5_{FRS}$, $6_S$ and $7_S$ can be carried out in the independent control mode in which the hydraulic braking pressures for the left and right drive-wheel brake devices $B_{FL}$ and $B_{FR}$ are independently controlled, when the driving force should be taken more into account, and in the collective control mode in which the hydraulic braking pressures for the left and right drive-wheel brake devices $B_{FL}$ and $B_{FR}$ are collectively controlled, when the stability should be taken more into account. In particular, when the independent control mode is employed, the results of comparison of the left drive-wheel velocity $V_{FL}$ with the higher and lower target velocities $V_{RHI}$ and $V_{RLI}$ for the independent control mode are delivered from the comparator circuits 29 and 30 to the left drive-wheel solenoid control circuit 15, while the results of comparison of the right drive-wheel velocity $V_{FR}$ with the higher and lower target velocities $V_{RHI}$ and $V_{RLI}$ for the independent control mode are delivered from the comparator circuits 31 and 32 to the left drive-wheel solenoid control circuit 16. Thus, the left drive-wheel solenoid control circuit 15 judges a slipping tendency of the left drive wheel on the basis of the left drive-wheel velocity $V_{FL}$ and produces control signals for the solenoids $4_{FLS}$, $5_{FLS}$, $6_S$ and $7_S$, while the right drive-wheel solenoid control circuit 16 judges a slipping tendency of the right drive wheel on the basis of the right drive-wheel velocity $V_{FR}$ and produces control signals for the solenoids $4_{FRS}$, $5_{FRS}$, $6_S$ and $7_S$. When the collective control mode is employed, the results of comparison of the averaged drive-wheel velocity $V_{FA}$ provided in the averaging circuit 18 with the higher and lower target velocities $V_{RHC}$ and $V_{RLC}$ for the collective control mode are inputted into the left and right drive-wheel solenoid control circuits 15 and 16 which then judge a slipping tendency of the drive wheels on the basis of the same drive-wheel velocity $V_{FA}$ and produce control signals for the solenoids $4_{FLS}$, $4_{FRS}$, $5_{FLS}$, $5_{FRS}$, $6_S$ and $7_S$.

The operation of this embodiment will be described below. When the vehicle travels on a sloping road or on a road with the left and right drive wheels in contact with road surface portions with different friction coefficients, the drive force should be taken more into account than the stability of the vehicle. In this case, the slipping tendency of the left and right drive wheels are judged independently, and the braking pressure for the drive wheel showing an increased slipping tendency is increased independently from the other wheel. This ensures that if the slipping tendency of one of the drive wheels is increased, then the hydraulic braking pressure for the associated one of the left and right drive-wheel brake devices $B_{FL}$ and $B_{FR}$ can be increased, while avoiding an increase in the braking force for the other drive wheel, thereby providing a reliable driving force for the vehicle by a differential limiting effect between the left and right drive wheels.

When the vehicle is travelling at a high speed, the stability of the vehicle should be taken into account more than the driving force. In this case, the hydraulic braking pressures for the left and right drive-wheel brake devices $B_{FL}$ and $B_{FR}$ are collectively controlled. More specifically, any excessive slipping tendency of the drive wheels is judged on the basis of the averaged value $V_{FA}$ of the left and right drive-wheel velocities, and the hydraulic braking pressures for the drive-wheel brake devices $B_{FL}$ and $B_{FR}$ are controlled in accordance with the result of judgement. Thus, it is possible to prevent variation in the torque on the drive wheels either on the left side or the right side that cause vibrations in the vehicle body along with variations in yaw. As a result, a driver would avoid experiencing any discomfort.

If the change-over is conducted in this manner so as to select the independent control mode when the driving force should be taken into account more and to select the collective control mode when the stability should be taken into account more, the generation of excessive slipping in the drive wheels can be inhibited with good sensitivity to insure the driving force at a desired level in the independent control mode, while in the collective control mode the hydraulic braking pressure control which may lead to the generation of a vibration of the vehicle can be made unnecessary.

Because the target velocities $V_{RHI}$ and $V_{RLI}$ of the drive wheels in the independent control mode are set larger than the target velocities $V_{RHC}$ and $V_{RLC}$ of the drive wheels in the collective control mode, the velocity of the drive wheel which is currently under a traction control in the independent control mode is controlled to a relatively large value. Thus, it is possible to reduce any difference between the ideal number of revolutions of engine determined by the velocities of the drive wheels and the actual number of revolutions of engine, thereby minimizing the restraining force applied from the drive wheels to the engine to avoid decreasing the number of revolutions of engine output and to avoid control hunting that deteriorates the operation control.

In addition, because the target velocities $V_{RHC}$, $V_{RLC}$, $V_{RHI}$, $V_{RLI}$ of the drive wheels are progressively increased or decreased at the time of change-over between the collective control mode and the independent control mode, the operation during the change-over can be conducted smoothly.

Figure 5:
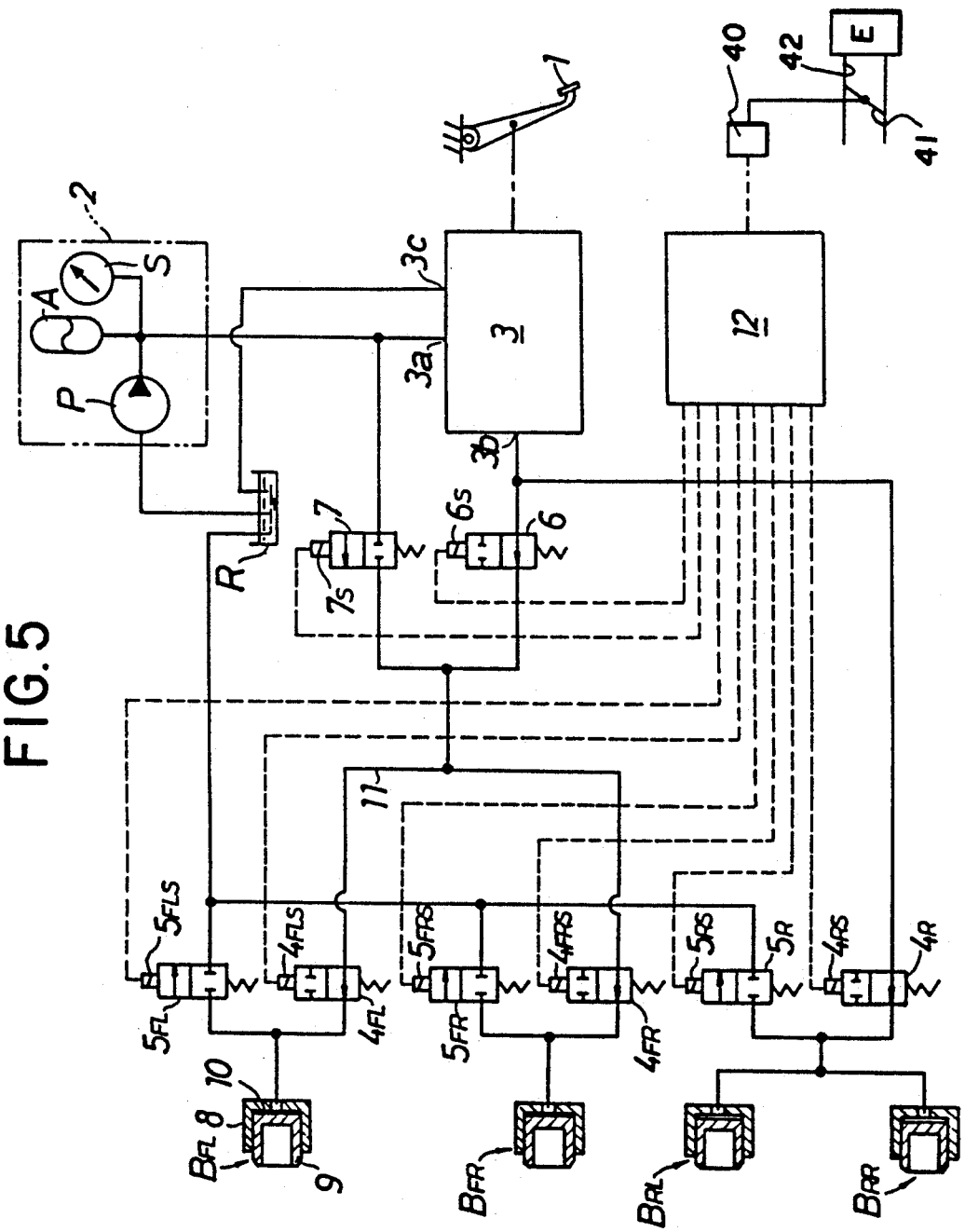
FIG. 5 is a schematic representation of traction control by controlling engine output power.

While the traction control effected only by controlling of the braking forces has been described in the above embodiment, it will be understood that the present invention is also applicable to a traction control using in combination a control for decreasing the engine output power and the above-described braking force control. As shown in FIG. 5, the traction control conducted by controlling decreases in engine output power is itself a conventionally known type using a throttle control. As shown in FIG. 5, a throttle 41 is operated for opening and closing an intake passage 42 connected to the engine E mounted on the vehicle. The operation of the throttle 41 is controlled by a throttle control means 40 on the basis of the command from the control means 12. In this case, the traction control, by controlling decreases in engine output, is a collective type of control and the target values of the velocities of the drive wheels for controlling those are set smaller than the corresponding target values $V_{RHC}$ and $V_{RLC}$ provided for the braking force control in the collective control mode. In doing so, it is possible to avoid any interference between the engine output power-decreasing control and the braking-force control, so that any insufficient traction caused by decreasing the engine output power can be compensated for by the braking force control during the collective control mode. Moreover, if the target values for the braking force control during the independent control mode are set higher than ($V_R$+(target value for the engine output power decreasing control−$V_R$)×2), insufficient traction force caused by the engine output power decreasing control can be compensated for by the braking force control during the traction control in the independent control mode. In place of the throttle control, a fuel amount control can be used.

It should be noted that in judging whether either the collective control mode or the independent control mode is to be selected, the independent control mode may be selected when the steering angle is equal to or less than a predetermined value, and the collective control mode may be selected when the steering angle has exceeded the predetermined value. The judgment may otherwise be carried out such that when the lateral acceleration of the vehicle is equal to or less than a predetermined value, the independent control mode may be selected, and when the lateral acceleration has exceeded the predetermined value, the collective control mode may be selected. As a further alternative, it may be arranged that when the yaw rate of the vehicle is equal to or less than a predetermined value, the independent control mode may be selected, and when the yaw rate has exceeded the predetermined value, the collective control mode may be selected.

We claim:

1. A traction control method for a vehicle for controlling the application of braking forces in a plurality of brake devices for drive wheels of the vehicle when slipping occurs in the drive wheels, the method comprising the steps of:
   determining the occurrence of slipping in the drive wheels during a current braking control mode;
   selecting a selected braking control mode from a collective control mode of controlling together the plurality of brake devices and an independent control mode of controlling each of the plurality of brake devices;
   changing over the braking control from the current braking control mode to the selected braking control mode;
   determining a target velocity for the drive wheels of the vehicle to be achieved through the selected braking control mode, wherein a target velocity for the drive wheels during the independent control mode is set to be higher than a target velocity during the collective control mode.

2. A traction control method for a vehicle as set forth in claim 1, wherein when changing over the braking control mode a target velocity for the drive wheels set in the current control mode is progressively changed in one of increasing and decreasing directions so as to reach a target velocity for the drive wheels in the selected control mode.

3. A traction control method for a vehicle as set forth in claim 1, further comprising the steps of: reducing a driving torque applied to the drive wheels during the collective control mode when slipping occurs in the drive wheels; and determining a target velocity for the drive wheels of the vehicle for reducing the driving torque being set to be lower than the target velocity for the collective control mode.

4. A traction control method for a vehicle as set forth in claim 3, wherein the step of reducing the driving torque applied to the drive wheels is carried out by decreasing output power of an engine mounted on the vehicle.

5. A traction control method for a vehicle as set forth in claim 1, further comprising the steps of: reducing a driving torque applied to the drive wheels during the collective control mode when slipping occurs in the drive wheels; and determining a target velocity for the drive wheels of the vehicle for reducing the driving torque being set in accordance with the following expression, wherein $V_R$ indicates a vehicle speed:

$V_{RE}$ is the target velocity for reducing the driving torque; and $V_{RI}$ is the target velocity for the independent control mode: $V_R+(V_{RE}-V_R)\times 2 < V_{RI}$.

6. A traction control method for a vehicle as set forth in claim 5, wherein the step of reducing the driving torque applied to the drive wheels is carried out by decreasing output power of an engine mounted on the vehicle.

7. A traction control method for a vehicle as set forth in claim 1, wherein the step of selecting a braking control mode is carried out based on a vehicle speed.

8. A traction control method for a vehicle as set forth in claim 1, wherein the step of selecting a braking control mode comprises the additional step of determining a difference between wheel velocities of the drive wheels.

9. A traction control method for a vehicle for causing a plurality of brake devices for drive wheels of the vehicle to apply braking forces to drive wheels of the vehicle when the drive wheels are in a driving condition and slipping occurs in the drive wheels, the method comprising the steps of:
   conducting selective braking control selected from a collective control mode of controlling together the plurality of brake devices and an independent control mode of controlling each of the plurality of brake devices;
   determining whether a driving force for the drive wheels of the vehicle should be considered or a stability of the vehicle should be considered; and
   selecting said independent control mode when the driving force for the drive wheels should be considered and selecting said collective control mode when the stability of the vehicle should be considered.

10. A traction control method for a vehicle as set forth in claim 9, wherein the step of selecting either of the control modes is carried out based on a vehicle speed.

11. A traction control method for a vehicle as set forth in claim 9, wherein the step of selecting a braking control mode comprises the additional step of determining a difference between wheel velocities of the drive wheels.

* * * * *